March 14, 1961 R. A. BABCOCK ET AL 2,975,267
AIR COOLED WHIP AND ELECTRODE HOLDER FOR WELDERS
Filed Sept. 11, 1957 2 Sheets-Sheet 1
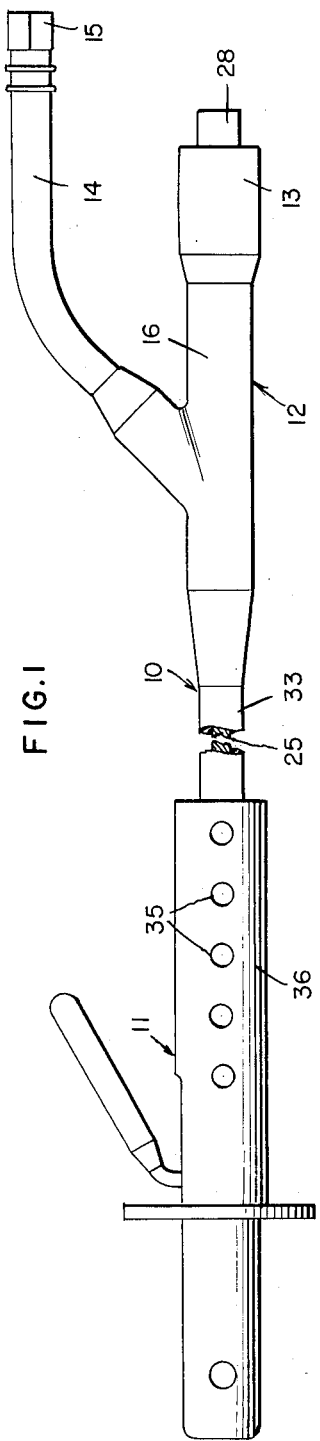
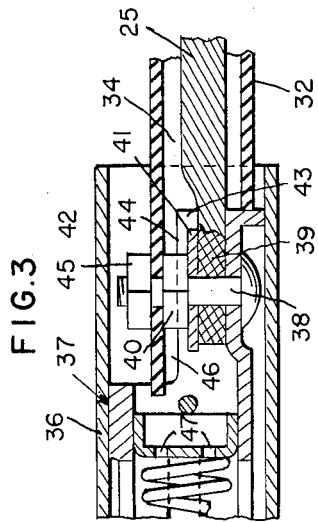
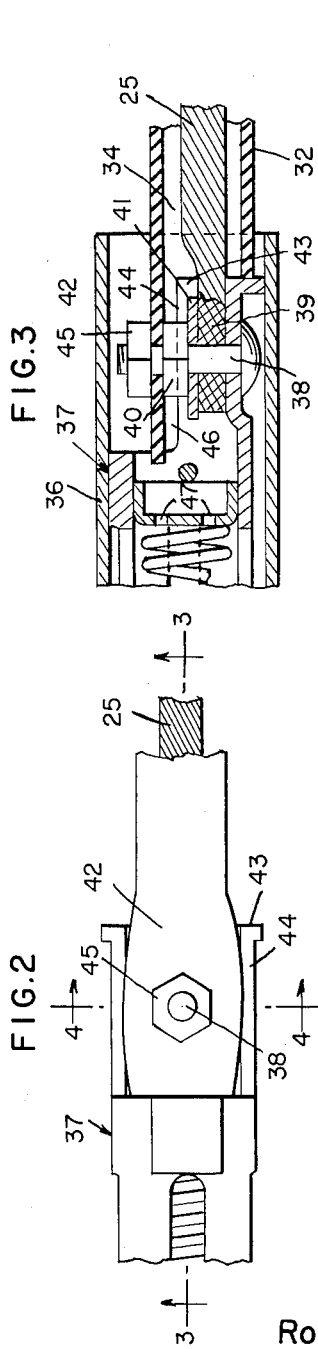
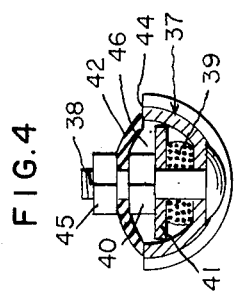
INVENTORS
Robert A. Babcock
Roger L. Putney
BY Shoemaker & Mattare
ATTORNEYS March 14, 1961 R. A. BABCOCK ET AL 2,975,267
AIR COOLED WHIP AND ELECTRODE HOLDER FOR WELDERS
Filed Sept. 11, 1957 2 Sheets-Sheet 2
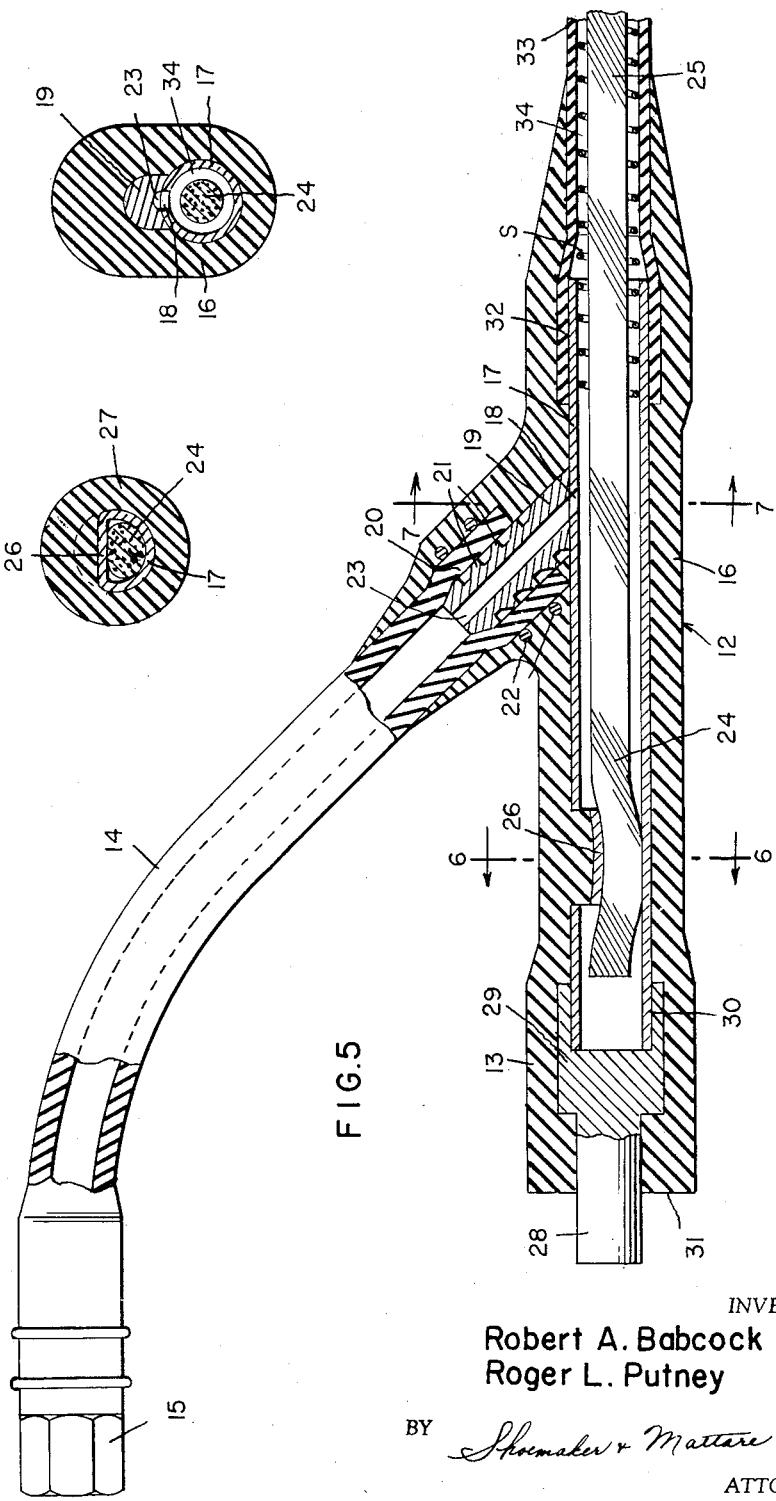
INVENTORS
Robert A. Babcock
Roger L. Putney
BY Shoemaker & Mattare
ATTORNEYS United States Patent Office 2,975,267
Patented Mar. 14, 1961

2,975,267
AIR COOLED WHIP AND ELECTRODE HOLDER FOR WELDERS

Robert A. Babcock, Abington, and Roger L. Putney, Rockland, Mass., assignors to J. B. Nottingham & Co., Inc., New York, N.Y., a corporation of New York Filed Sept. 11, 1957, Ser. No. 683,271

8 Claims. (Cl. 219—138)

This invention relates to the welding art and pertains more particularly to means for cooling an electrode holder and associated whip assembly.

In the welding art, it is well known that the dissipation of heat from electrode holders and their associated whips becomes a considerable problem where the welding current is of relatively high value and substantially continuous welding or at least welding over a substantial period of time is involved. It is not uncommon, under such circumstances, for the welders to employ actually a bucket of cool water into which the electrode holder is periodically plunged to cool the same to a sufficiently low temperature as to enable the operator to continue the welding operation without undue discomfort or possible injury.

In the prior art, the use of water cooled electrode holder assemblies has been attempted. However, in order to maintain a high degree of efficiency in the welding operation, the welder cannot be expected to use a holder which is any heavier than it absolutely must be and the use of water cooled electrode holders renders them so heavy as to be practically valueless, except for extremely short periods of operation and, under such circumstances, the necessity of water cooling is not present anyhow.

It is, therefore, a primary object of this invention to provide means for maintaining a welding electrode holder in cooled condition, sufficient for sustained welding operations while at the same time avoiding any material addition of weight thereto such as would tend to cause undue fatigue on the part of the welder or operator.

Another object of this invention is to provide means for cooling welding electrode holders and associated assemblies wherein the cooling medium used does not in itself add any additional weight to such assemblies.

Still another object of this invention is to provide an improved electrode holder for welding which is air cooled.

Another object of this invention is to provide a combination wire whip and electrode holder which is air cooled and wherein the whip incorporates a cable connector assembly for connection to an outlet of a main welding supply line and wherein such connector also incorporates means for connecting the assembly to a source of air under pressure which is directed first into the connector and thence longitudinally along and in enveloping relationship with the current supplying cable leading to the electrode and finally to a discharge point directly within the confines of the electrode holder so as to maintain the same at a substantially uniform temperature which is of a value low enough to avoid discomfort to the person using the same so as to permit the assembly to be utilized for extended periods of time without overheating and wherein at the same time the current supplying cable is maintained at a materially lower temperature than it otherwise would attain and to thus prolong the life of the same.

A further object of this invention is to provide an improved whip assembly for electrode holders embodying a Y-type connector adapted for connecting the holder to a main current supply and for simultaneously connecting the same to a source of air under pressure, and wherein the whip incorporates a length of current supplying cable enveloped within an outer sheath, the inside diameter of the sheath being materially greater than the outside diameter of the cable so as to povide an air passageway of generally annular form and wherein the air connection to the connector leads into the space surrounding the cable so as to direct a flow of air longitudinally along the cable to maintain the same at lowered temperatures when in use.

Another object of this invention is to provide an improved whip assembly for welding electrode holders incorporating a Y-shaped cable connector having one branch for connection to a main current supply cable and another branch for connection to a supply of air under pressure, the third branch of the connector, which leads to an associated electrode holder, being in the form of a centrally disposed current carrying cable and a surrounding sheath of insulating material, the sheath being of a larger internal diameter than the outside diameter of the cable to provide a cooling medium conveying space therebetween and to render a greater degree of flexibility to the current supplying branch and render the whip assembly more maneuverable.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a view showing the improved whip assembly and associated electrode holder, a medial portion of the whip being broken away;

Fig. 2 is an enlarged plan view showing the manner in which the outer sheath of the whip assembly is connected to the core of the electrode holder;

Fig. 3 is a longitudinal section taken substantially along the plane of section line 3—3 of Fig. 2 and illustrating further the connection between the whip and the electrode holder;

Fig. 4 is a transverse section taken substantially along the plane of section line 4—4 of Fig. 2 and illustrating further details of the assembly;

Fig. 5 is an enlarged view of the connector assembly, partly in section, illustrating details of internal construction thereof;

Fig. 6 is a transverse section taken substantially along the plane of section line 6—6 of Fig. 5 and showing the method of connecting the current carrying cable to the connector body; and Fig. 7 is a transverse section taken substantially along the plane of section line 7—7 of Fig. 5 and illustrating details of the cooling medium connection.

Referring now more particularly to the drawings, the whip assembly is shown in its entirety in Fig. 1 and is designated therein generally by the reference character 10. The whip assembly is a relatively short assembly carrying the electrode holder 11 at one end thereof and having its opposite end adapted for connection to a main supply cable by means of the connector indicated generally by the reference character 12. In conventional constructions, the whip is perhaps eight feet long and is connected to the main source of welding current by any suitable and conventional connector which carries at its opposite end the electrode holder. The cable of the whip assembly which carries the welding current to the electrode is encased, in the conventional construction, in a sheath of insulating material which tightly embraces the cable and insulates the same. The covering for the cable is flexible and permits the whip to be coiled when not in use and lends a substantial amount of maneuverability thereto when in use.

In accordance with this invention, the portion 13 of the connector 12, which is connected to the main supply cable, is similar to those conventionally used. However, the connector assembly embodies a further connection 14 above and beyond that which is used with the usual construction. This further connector 14 is provided with a coupling nut 15 for connection to a compressed air line and the main portion thereof consists of a tube extending from this nut to the main body portion 16 of the connector assembly. The internal construction of this connector assembly is shown most clearly in Fig. 5 and will be seen to consist of an elongate tubular body 17 of copper or other metal having good electrically conductive characteristics. The metal tube 17 is provided with an aperture 18 and brazed or otherwise suitably connected to the outer surface of the body 17 is a nipple 19 of standard construction for receiving the end 20 of the air conducting tube 14. As can be seen, the outer surface of the nipple 19 is provided with a series of ribs 21 and wrapped about the tube end 20 to press the same into engagement with such ribs are the wire elements or similar clamping members 22 so as to provide an air tight connection. The nipple 19 is provided with a longitudinally extending bore 23 which is in register with the aperture 18 in the tube body 17 so that when the air connection 14 is operatively associated with a source of pressurized air, the interior of the tube 18 will be subjected to such air under pressure.

An end portion 24 of a supply cable 25 which extends to the previously mentioned electrode holder 11 is disposed within the tube 17 and a portion of the tube 26 is crimped upon the cable so as to anchor the same and establish good electrical contact therewith. This crimped portion 26 of the tube is shown more clearly in Fig. 6 wherein it will be seen that such portion of the tube is flattened upon the cable portion 24 to firmly clamp upon the same, the outer or insulating portion 27 of the body 16 being firmly molded in close contact around this crimped portion of the tube.

To the end of the tube 17 opposite that end thereof from which the cable 25 projects is secured a plug element 28 which has an enlarged inner end portion 29 having a recess therein receiving the end portion 30 of the tube 17 and which portion 29 is brazed or otherwise affixed to the tube so as to obtain a good electrical contact therewith. A portion of the plug element 28 extends beyond the end face 31 of the insulating body 16 and is adapted to be plugged into the main welding current supply line and for this purpose may take any conventional form. By this construction, it will be apparent that, when the plug element 28 is electrically connected to the main current supply line, the current will be carried through this element and to the tube 17 and thence to the cable portion 24 and on up to the electrode holder 11.

Covering the opposite end of the tube 17 is the end portion 32 of the cable insulating sheath 33. From Fig. 5, it will be apparent that the outer insulating body 16 is molded about the various component parts 17, 19, 28 and 32 so as to form an air tight and water tight insulating covering thereabout. Preferably, the nipple 19 is disposed at an acute angle with respect to the tube 17, as shown, so that the connector assembly 12, in its entirety, is of generally Y-shaped configuration. This permits the connections to be made to the main supply line and the air line in the most advantageous manner without unsightly and dangerous loops of line lying about. That is to say, the main supply line and air line may be laid down right next to each other and the tube 14 may be flexed to almost lie beside the main supply line when connected to the air line.

It will be noted that the cable 25 is of substantially smaller diameter than the inside diameter of the tube 17 and that likewise, the cable is of substantially smaller diameter than the inside diameter of the sheath 33 so as to provide an annular air space 34 in surrounding relationship to the cable 25.

Thus, the sheath 33 provides an air channel in surrounding relationship to the cable 25 up to the electrode holder 11 and the purpose of this construction is to channel the air in such a manner as to discharge through the various openings 35 in the handle 36 of the electrode holder to thus conduct heat away from the holder so that the same may be used in continuous operation for greater periods of time without causing discomfort to the welder.

The cable 25, as seen most clearly in Figs. 2 and 3, is electrically connected to the metal core 37 of the electrode holder by means of a bolt 38 which extends through this core and through a suitable aperture provided in the end portion 39 of the cable and which cooperates with a nut element 40 and washer 41 to mash the cable against the body of the core 37, thus establishing a good electrical connection between the cable 25 and the metal core 37 of the electrode holder. The corresponding end 42 of the sheath 33 is notched or cut away to correspond in contour with the edges 43 and 44 of the core body 37 and the resultant tab-like formation thus afforded the end portion 42 is anchored to the core by means of the bolt 38 and associated nut 45 so that the previously mentioned channel 34 is provided with a discharge mouth 46 to direct the air within the confines of the electrode holder handle 36 and to pass longitudinally thereof for discharge through the various openings 35.

The construction of the electrode holder 11 and its corresponding core 38 is entirely conventional and the specific manner of attaching the cable ends 39 and end portion 42 of the sheath 33 is dictated by the specific construction of the core element of the particular electrode holder with which the assembly is utilized. However, it is of importance that the discharge of the air be such as to extend longitudinally throughout a substantial extent of the core 37 and thence outwardly through openings in the handle 36 so as to not only maintain the core cool by circulation of air, but also to maintain a relatively cool flow of air outwardly through the handle and against the gloved hand of the welder. If the core 37 is not so constructed as to allow for longitudinal flow, suitable openings 47 may be provided therein or in any other convenient place where needed to permit the air to flow in the manner desired.

The sheath 33 not only provides an air channel for conducting the air to the electrode holder, but it also permits greater flexibility of the whip assembly. That is to say, the sheath 33, being of larger diameter than the cable 25 is of greater flexibility than were the cable provided with a snugly fitting insulation layer. Thus the fact that the sheath is larger than the cable not only provides the aforementioned air channel, but it also achieves the beneficial result of permitting greater flexibility of the whip assembly, a definite advantage particularly in shipboard welding.

As shown most clearly in Fig. 5, it is preferred to utilize a spring S in the forward end of the connector assembly, which spring projects into the forward end of the body 17 and outwardly therefrom within the sheath 33 and beyond the juncture between the sheath and the forward end of the main body portion 16. The purpose of this spring is to reinforce the connector assembly while retaining the flexibility thereof and prevent the assembly from bending sharply at the juncture of the sheath and main body portion which might tend to cause breakage at this point. The spring has the effect of distributing the flexure of the assembly throughout a greater length of the same and relieve the juncture of the sheath and main body portion of undue strain.

Actual tests conducted with a whip assembly constructed in accordance with this invention as compared with conventional whip assemblies clearly establishes the fact that the operating temperature not only in the region of the electrode holder handle but also the operating temperature of the cable 25 is materially reduced by the instant construction. For example, as compared with a non-air cooled whip assembly wherein the temperature of the handle was 171° F. and the temperature of the cable was 250° F. with an air cooled whip assembly constructed in accordance with this invention, the temperature of the handle was 110° F. and the cable 110° F. In both cases, the electrode holders proper were identical, 450 amperes of current were used in each case with 5/16" electrodes used in each case and the temperatures were recorded in each case at the end of nine minutes of continuous welding. Thus, it can be graphically illustrated that the advantages attained by the instant construction are material and of extreme benefit in this particular art.

We claim:

1. In combination with a welding electrode holder, a whip assembly for connecting the holder to a source of welding current, said whip including a current conducting cable connected at one end to the holder and having means at its opposite end for connection to a source of welding current, a protective, insulating sheath surrounding the length of said cable and having a greater internal diameter than the outer diameter of the cable to provide and air channel along the cable, and means for connecting the end of said whip remote from the holder and adjacent said opposite end of the cable to a source of air under pressure, so as to provide cooling of the cable throughout substantially its entire length and also to provide cooling of the holder.

2. In combination with an electrode holder having a metallic core and a surrounding insulated handle member, a welding whip assembly including an electrical conducting cable connected at one end to said core and having its opposite end adapted for connection to a source of welding current, a protective sheath surrounding said cable and of larger internal diameter than such cable to provide an air passageway longitudinally of the cable and extending up and into the insulated handle of the holder for discharge thereinto to conduct cooling medium to the holder, and means for connecting said sheath to a source of air under pressure, adjacent said opposite end of the cable to also provide cooling of the cable throughout substantially its entire length.

3. In combination with an electrode holder having a metallic core and a surrounding insulated handle, an electric cable connected at one end to said core for conducting welding current thereto and having its opposite end connected to a metallic tube of larger diameter than the cable, the free end of the tube being provided with a connector plug for establishing electrical connection between the cable and a source of welding current, a nipple extending from said tube and having a longitudinal bore there-through leading into the interior of said tube adjacent to said opposite end of the cable and the nipple having means associated therewith for connection to a source of air under pressure, a tubular insulating sheath of flexible material secured at one end to said electrode holder and having its opposite end connected to the end of said tube opposite said plug, the sheath being of larger diameter internally than the outer diameter of said cable to provide an air channel therebetween and serving to cool the cable throughout substantially its entire length and having that end thereof connected to said holder associated with the holder in such a manner as to discharge cooling medium under pressure into the interior of the handle of the holder, and said tube and said nipple having an envolping coating of insulating material therearound to seal the same against the loss of cooling medium therefrom as introduced thereinto through said nipple.

4. The assembly as defined in claim 3 wherein said nipple is disposed at an acute angle to said tube whereby the tube and nipple together with the surrounding layer of insulating material form a Y-shaped connector for connection to a source of cooling medium and to the source of welding current.

5. In combination with a welding rod holder of the type having a core and a surrounding handle of insulating material, a whip assembly for supplying welding current and cooling medium to said holder, said whip assembly including a length of cable connected at one end to said core and at its opposite end to a source of welding current, a protective sheath surrounding said cable and providing therewith an air passageway extending into the handle of said holder, and means for supplying air under pressure to the air passageway between the cable and sheath at a point adjacent said opposite end of the cable so as to provide cooling of the cable throughout substantially its entire length and also to provide cooling of said holder.

6. A welding whip comprising an elongate hollow metallic body having one end thereof closed and forming a plug element for connection to a source of welding current, an insulating cover about said body exposing said plug end thereof, a flexible protective sheath extending into said cover coaxially with the open end of said body, an electrically conductive cable of smaller diameter than said protective sheath and said cable extending through said sheath and into said body and being anchored within the latter and electrically connected thereto and with said plug element, a flexible tube connected to said cover and having a passageway leading to said hollow body and including means for connection to a source of air under pressure whereby coolant air may be introduced into said body and axially along said conductor through said sheath.

7. A welding whip comprising an elongate tube of substantially uniform diameter, a length of electrically conductive cable having one end thereof received within said tube and electrically connected thereto, said cable being of smaller diameter than said tube to define an air passageway about said cable and axially therealong, said cable being of substantially greater length than said tube to project therebeyond, a protective sheath anchored at one end to said tube and of substantially the same diameter as the tube and enclosing that portion of the cable extending beyond the tube to effect a continuation of the air passageway around the cable and axially thereof within said tube, a nipple rigidly joined to said tube at an intermediate point thereof and having a passageway therethrough communicating with the interior of said tube, a plug element joined to said tube at the end thereof opposite to the end from which said cable projects for connection to a source of welding current, and an insulating cover surrounding a portion of said plug and the entirety of said tube and said nipple and serving in part to join said sheath rigidly with said tube, leaving the free end of said plug exposed for electrical connection to the source of welding current, and there being a flexible tube connected to said nipple extending from said cover for connection to a source of air under pressure.

8. Welding apparatus comprising an elongate tube of substantially uniform diameter, a length of electrically conductive cable having one end received within said tube and electrically connected thereto, said cable being of smaller diameter than said tube to define an air passageway about said cable and axially therealong, said cable being of substantially greater length than said tube to thereby project therebeyond, a protective sheath anchored at one end to said tube and being of substantially the same internal diameter as the tube and enclosing that portion of the cable extending beyond the tube to effect a continuation of the air passageway around the cable and axially thereof within said tube, a nipple rigidly joined to said tube at an intermediate point thereof adjacent the point of connection of said one end of the cable and having a passageway therethrough communicating with the interior of said tube, a plug element joined to said tube at the end thereof opposite to the end from which said cable projects for connection to a source of welding current, an insulating cover surrounding that portion of said plug and the entirety of said tube and said nipple and serving in part to join said sheath rigidly with said tube, leaving the free end of said plug exposed for electrical connection to the source of welding current, there being a flexible tube connected to said nipple for connection to a source of air under pressure for cooling the cable throughout substantially its entire length, and a welding electrode holder including a hand grip portion and a nose piece for removably holding a welding electrode, said cable being projected into that end of said hand grip portion remote from the nose and electrically connected therewithin to the holder assembly for conducting welding current to the nose piece and consequently an electrode held thereby, said hand grip portion being hollow and being provided with air vents in spaced relation therealong, and said sheath being projected into and secured within said hand grip portion for discharging air thereinto and axially thereof to ultimately escape through said vents.

References Cited in the file of this patent

UNITED STATES PATENTS

| | | |
|---|---|---|
| 1,548,204 | Moesta | Aug. 4, 1925 |
| 1,853,101 | Von Henke | Apr. 12, 1932 |
| 1,878,790 | Lund | Sept. 20, 1932 |
| 1,884,570 | Chapman | Oct. 25, 1932 |
| 2,013,585 | Sciaky | Sept. 3, 1935 |
| 2,193,977 | Martin | Mar. 19, 1940 |
| 2,213,478 | Swanson | Sept. 3, 1940 |
| 2,241,687 | Warnke | May 13, 1941 |
| 2,350,614 | Jackson | June 6, 1944 |
| 2,389,969 | Fadeley | Nov. 27, 1945 |
| 2,423,324 | Johnson et al. | July 1, 1947 |
| 2,432,639 | Webster | Dec. 16, 1947 |
| 2,701,818 | Tims | Feb. 8, 1955 |
| 2,865,972 | Augsburger | Dec. 23, 1958 |

FOREIGN PATENTS

| | | |
|---|---|---|
| 516,902 | Germany | Jan. 29, 1931 |
| 504,377 | Canada | July 13, 1954 |
| 685,746 | Great Britain | Jan. 7, 1953 |
| 774,204 | Great Britain | May 8, 1957 |